US008296950B2

(12) United States Patent
Colbrunn et al.

(10) Patent No.: US 8,296,950 B2
(45) Date of Patent: Oct. 30, 2012

(54) PRE-AGING OF ROLLERS, GASKETS, OR O-RINGS TO IMPROVE MATERIAL RESPONSE TO COMPRESSION SET AND COMPRESSION STRESS RELAXATION

(75) Inventors: Robb Colbrunn, Hinckley, OH (US); Scott Turk, Brunswick, OH (US); Christopher Tainer, Strongsville, OH (US); Pete Botten, Lakewood, OH (US); Eric Lehuta, Medina, OH (US); Lawrence Srnka, Northfield Center, OH (US)

(73) Assignee: Codonics, Inc., Middleburg Heights, OH (US)

( * ) Notice: Subject to any disclaimer, the term of this patent is extended or adjusted under 35 U.S.C. 154(b) by 1619 days.

(21) Appl. No.: 11/297,847

(22) Filed: Dec. 8, 2005

(65) Prior Publication Data

US 2007/0134044 A1 Jun. 14, 2007

(51) Int. Cl.
*B21K 1/02* (2006.01)
*C08F 6/00* (2006.01)
*C08J 3/00* (2006.01)

(52) U.S. Cl. ............. 29/895.33; 528/502 C; 528/502 R; 264/570; 264/907; 264/900; 521/918; 29/895

(58) Field of Classification Search .............. 528/502 C, 528/502 R; 264/570, 907, 900; 521/918; 29/895, 895.1, 895.3, 895.33
See application file for complete search history.

(56) References Cited

U.S. PATENT DOCUMENTS 3,061,885 A * 11/1962 Rogers, Jr. et al. ............. 264/50
3,100,759 A * 8/1963 Boussu et al. ........... 525/440.03
3,266,927 A * 8/1966 Lorenz et al. ................. 427/177
3,357,940 A * 12/1967 Rutherford ................... 524/410
3,627,610 A * 12/1971 Guelich et al. ................ 156/278
3,655,727 A * 4/1972 Patel et al. ................. 525/326.3
3,681,980 A * 8/1972 Decker ........................... 73/794
3,712,877 A * 1/1973 Patel et al. .................... 525/340
3,767,757 A * 10/1973 Vroom et al. ................. 264/291
4,359,336 A * 11/1982 Bowles ........................... 419/49
5,429,782 A * 7/1995 Masutani et al. ............. 264/127
5,577,368 A * 11/1996 Hamilton et al. ............... 53/432
5,816,090 A * 10/1998 Hodge et al. ...................... 72/56
6,184,265 B1 * 2/2001 Hamilton et al. ............. 522/189
6,512,088 B2 * 1/2003 Stroppiana ................ 528/502 C
6,545,113 B2 * 4/2003 Stroppiana ................... 526/335
7,520,778 B1 * 4/2009 Chong .......................... 439/559
2006/0125146 A1 * 6/2006 Sandstrom .................... 264/313
2009/0082546 A1 * 3/2009 Schroeder et al. ......... 528/502 C

OTHER PUBLICATIONS

"Application Success Stories: Compression Set vs. CSR," Parker Hannifin Corp., Problem Solved, Issue No. 3, Volume No. 1, Oct. 2003.
"Compression Set, Outgassing / Extraction and Installation Damage," Problem Solving Products, Inc., retrieved from http://www.pspglobal.com/fabriccup.html.
Parker Hannifin Corporation, "TechSeal Division PerFab™ Design Guide".

* cited by examiner

*Primary Examiner* — Essama Omgba
(74) *Attorney, Agent, or Firm* — Pearne & Gordon LLP

(57) ABSTRACT

Provided is a method of stabilizing an elastomeric property of an elastomeric material. The method includes placing the elastomeric material in a pressurizing chamber and applying a suitable hydrostatic pressure to the elastomeric material within the pressurizing chamber to at least partially compress the elastomeric material. Application of the hydrostatic pressure is maintained for a period of time suitable to at least partially stabilize a restorative force exhibited by the elastomeric material in response to subsequent exposures of the elastomeric material to a compressive force.

14 Claims, 12 Drawing Sheets

PRE-AGING OF ROLLERS, GASKETS, OR O-RINGS TO IMPROVE MATERIAL RESPONSE TO COMPRESSION SET AND COMPRESSION STRESS RELAXATION

BACKGROUND OF THE INVENTION

Compression set and compression stress relaxation are both physical properties of materials. These properties are discussed or disclosed for specific materials in elastomeric material data sheets. A measurement of compression set is the percent reduction in dimensional thickness of a material after the material is compressed for a fixed time and at a fixed temperature. A measurement of compression stress relaxation is the reduction in restoration force of a material as the material is being compressed at a constant strain for a fixed time and at a fixed temperature.

Compression set and compression stress relaxation cause negative side effects in platen rollers. For example, a platen roller used in a thermal printer that prints two different media widths experiences negative side effects due to compression set and compression stress relaxation. Specifically, if too many sheets of the smaller width media are printed, especially during an initial utilization, (the initial utilization being approximately the first 1000 prints or the first five percent of the printer life), the rubber in the center portion of the platen roller experiences compression stress relaxation. The rubber in the center portion of the platen roller refers to or corresponds to the location on the platen roller corresponding to the width of the small width media. As a result of the compression stress relaxation, when the larger width media is printed utilizing the platen roller, an image artifact of lighter optical density appears on the larger width media in the location that corresponds to the width of the small width media.

Optical density may be represented in a range from 0 (open air) to 4 (very black). The measurement of optical density is a logarithmic scale where the optical density (OD) value is a negative exponent of the log base 10 value of light transmission ($T=10^{-OD}$). Light transmission is usually expressed in terms of a percentage, e.g., if OD=0, the light transmission is equal to 100% and all light is being transmitted: if OD=1, light transmission is 10%; if OD=2, light transmission is 1%; if OD=3, light transmission is 0.1%, and if OD=4, light transmission is 0.01%. If one part of a film has a different "background OD" than another part of the film, then the part of the film with the different background OD is considered to have an image quality artifact.

As noted above, this image quality artifact is a degradation of the image quality for the film because the used portion of the roller produces the different optical density on the film when compared to the unused portion. This lighter density is attributed to the reduction in reaction force by the relaxed rubber (in the center portion of the platen roller corresponding to the width of the small width media) which results in less thermal pressure/contact at the media and printbead nip. DIN 6868-56 is a regulatory standard for medical hard copy film imagers and requires that the images produce prints to meet certain image quality guidelines. If the film has a certain number or a certain percentage of image artifacts, the hard copy film imager generating the film may not meet regulatory standard DIN 6868-56, and this makes the medical image printer unusable in a medical imaging environment.

In addition, compression set and compression stress relaxation also cause negative side effects in gasket and O-ring materials. Gasket and O-ring materials tend to leak over time and can no longer provide a sufficient seal. In some cases, this is a result of the gasket or O-ring material relaxing. Initially, when a gasket is tightened, the force that the gasket exerts (pushes) against the mating parts is sufficient to seal properly. This force reduces over time as a result of the compression set and compression stress relaxation property of the gasket and O-ring materials, thus causing the leak.

A prior method to reduce the negative effects of the compression set and the compression stress relaxation is to select a different material for the platen roller, the O-ring, or the gasket. At the molecular level, compression set and compression stress relaxation are the result of the breaking (and subsequent reforming while compressed to try to achieve the lowest energy state) of cross-links in the molecular chains of the compound or material which is utilized to make the roller, O-ring, or gaskets. In order to reduce the breaking of these cross-links, a solution is to utilize a material that is a higher durometer material, i.e., a harder material. In other words, the durometer must be increased. This is a challenge in many applications because, for example, in an application utilizing platen rollers, this would cause small defects in the roller surface to be more likely to show up on the image (if it is a high durometer vs. a low one). In the case of an O-ring, temperature and pressure cycling causes movement of the seal and a high durometer O-ring may not be flexible enough to accommodate this variation and still provide an adequate seal. In other words, a lower durometer material may provide other benefits and these benefits may be essential or beneficial to the functioning of the apparatus that utilizes the roller, O-ring, or gasket. Also, selecting a different material (compound) may result in chemical compatibility issues with other materials being utilized in the apparatus. FIG. 1(*a*) illustrates restorative force of two materials according to the prior art. As is illustrated in FIG. 1(*a*), the sample #2 material, which illustratively may be a preferable roller material, has decreasing restorative force which is sloping in a downward fashion even at 70 hours of utilization.

Accordingly, a need exists to have rollers made of a lower durometer material which is not as influenced by compression set and compression stress relaxation in a printing environment where a large format media width and a small format media width are utilized. A need also exists for O-rings, and gaskets to maintain sealing properties and to not leak due to the onset of compression set and compression stress relaxation.

BRIEF DESCRIPTION OF THE INVENTION

FIG. 1(*b*) is a graph illustrating a compression stress relaxation curve after pre-aging rollers according to an embodiment of the invention;

FIG. 2(*a*) illustrates a change in optical density for a standard roller compared to a pre-aged roller (exposed to a hydrostatic chamber) according to an embodiment of the present invention;

FIG. 2(*b*) illustrates application of a pressure over a duration of 12, 24, and 48 hours in a hydrostatic pressure chamber pressurized at 90 pounds per square inch;

Figure 4A:
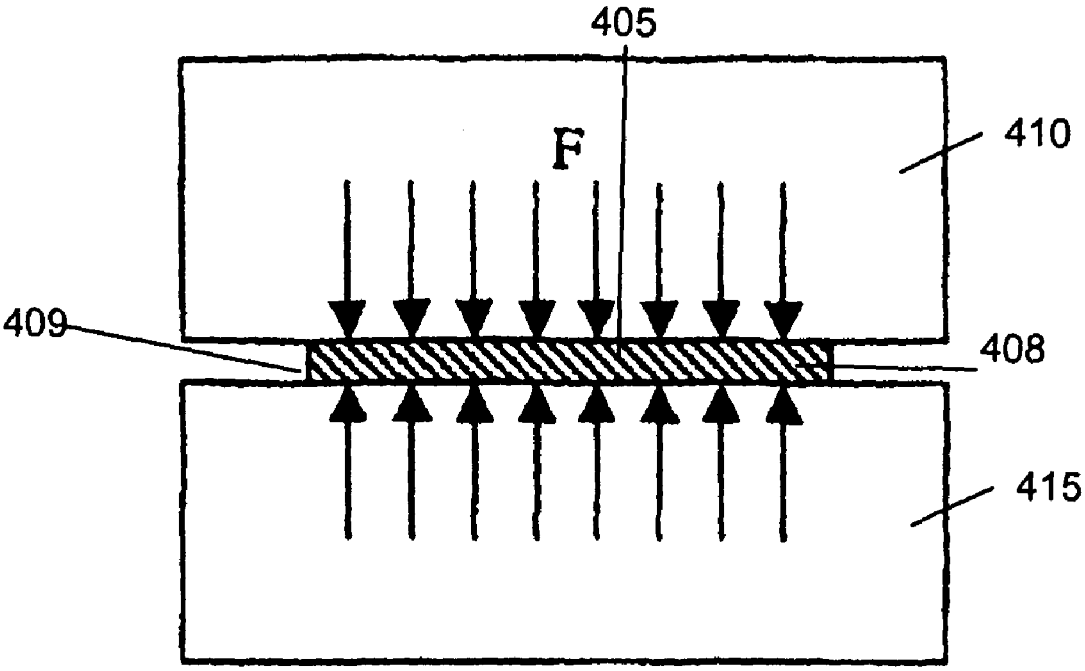
Figure 4B:
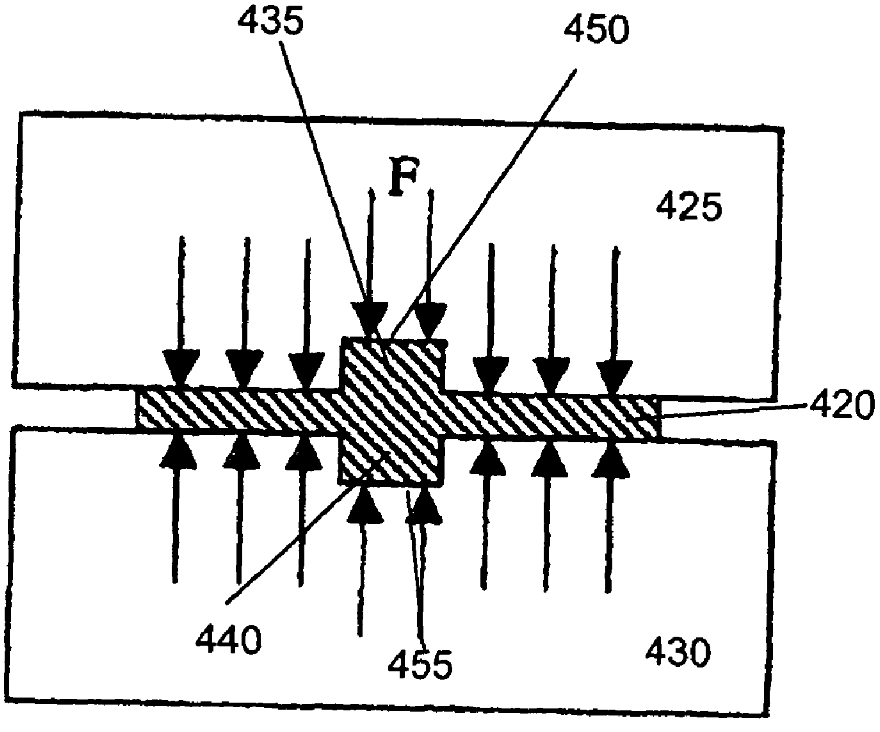
Figure 4C:
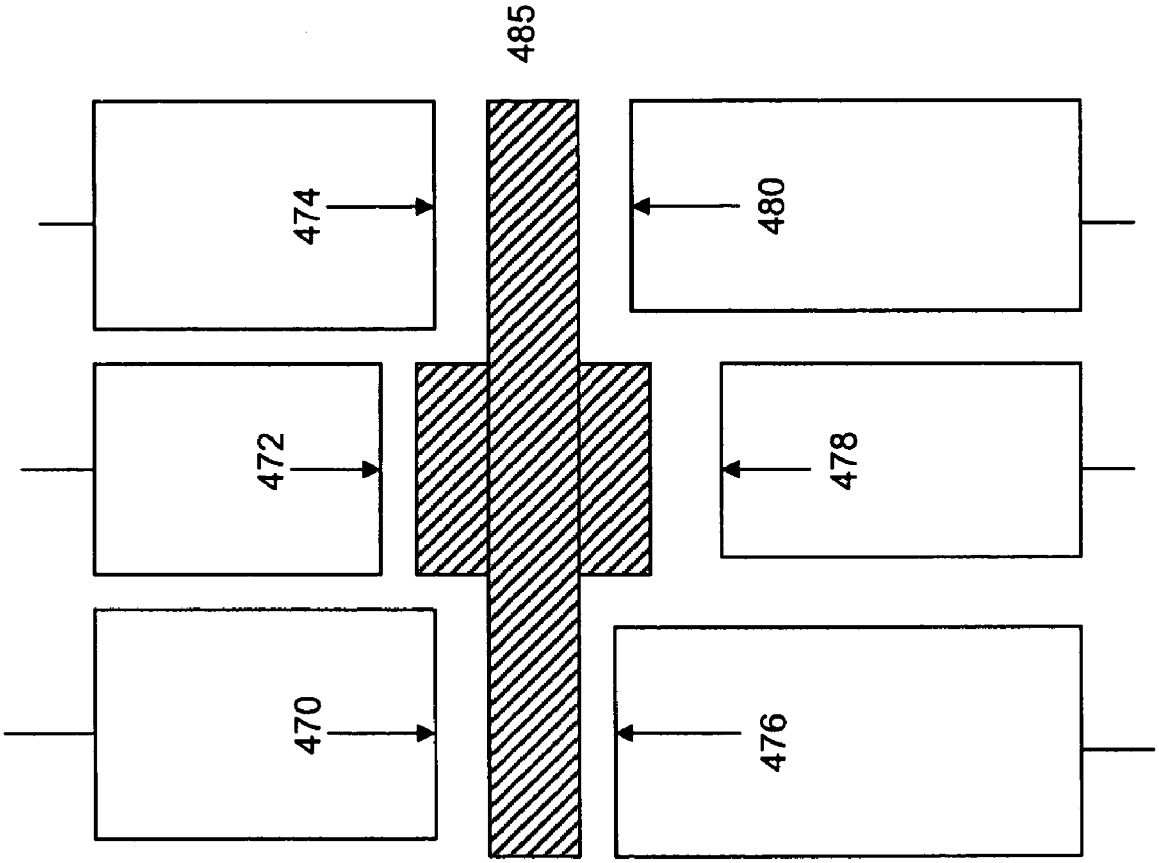
Figure 5:
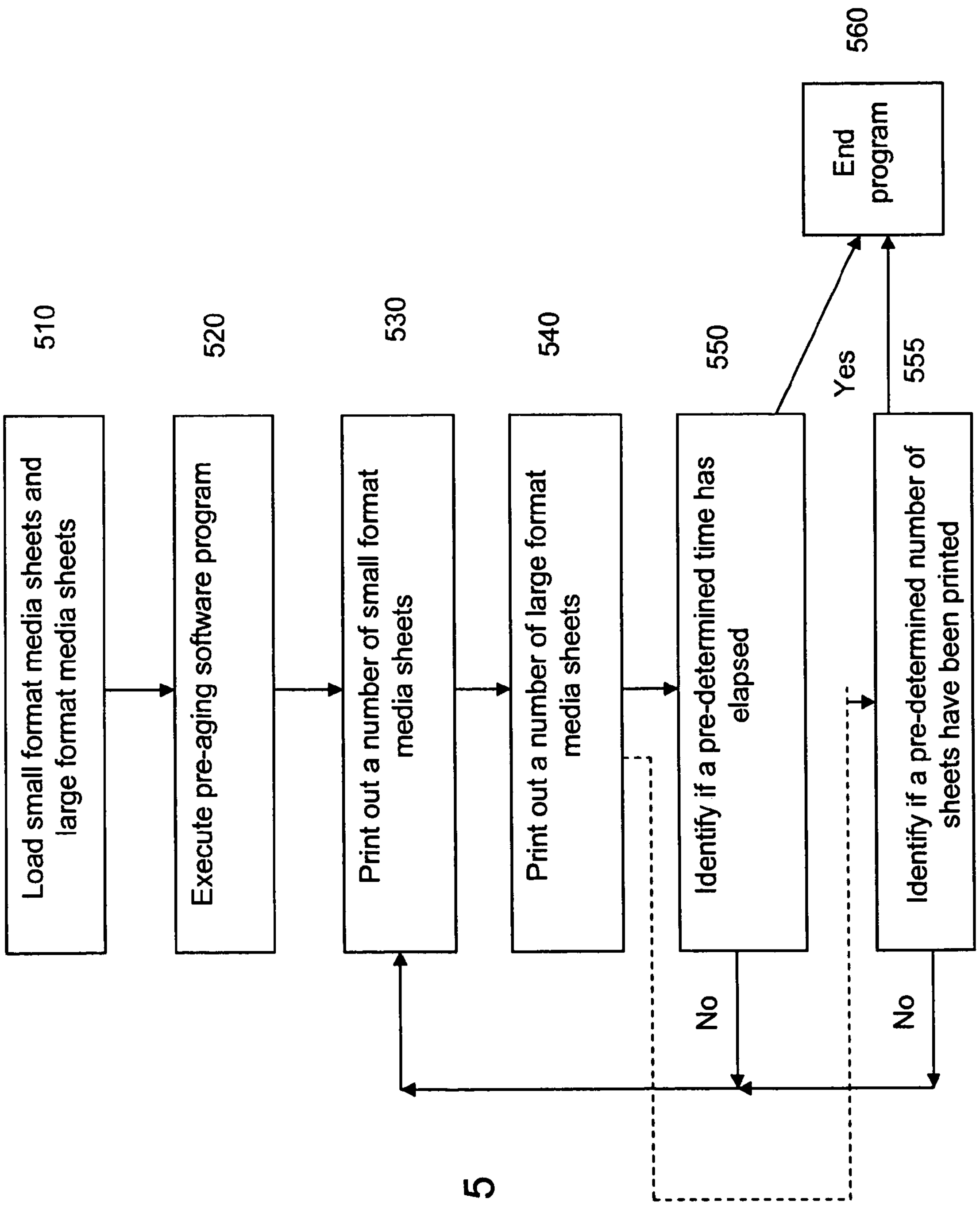

FIGS. 3(*a*) and 3(*b*) illustrate an embodiment of the invention for dynamic loading of a platen roller according to embodiments of the present invention;

FIG. 3(*c*) illustrates a fixture for applying pressure according to an embodiment of the present invention;

FIG. 3(*d*) illustrates an exploded view of the fixture for applying pressure according to an embodiment of the present invention;

FIG. 3(*e*) illustrates a change in optical density in a roller that is placed in the pre-aging process fixture according to an embodiment of the invention;

FIGS. 4(*a*) and 4(*b*) illustrate a pre-aging technique for flat or a complex-shaped structure or geometry according to an embodiment of the invention;

FIG. 4(*c*) illustrates a plurality of pressure apparatus and a complex geometry O-ring or gasket according to an embodiment of the present invention; and FIG. 5 illustrates a flowchart of a method of extending platen roller life and increasing performance according to an embodiment of the invention.

DETAILED DESCRIPTION OF THE INVENTION

Figure 1A:
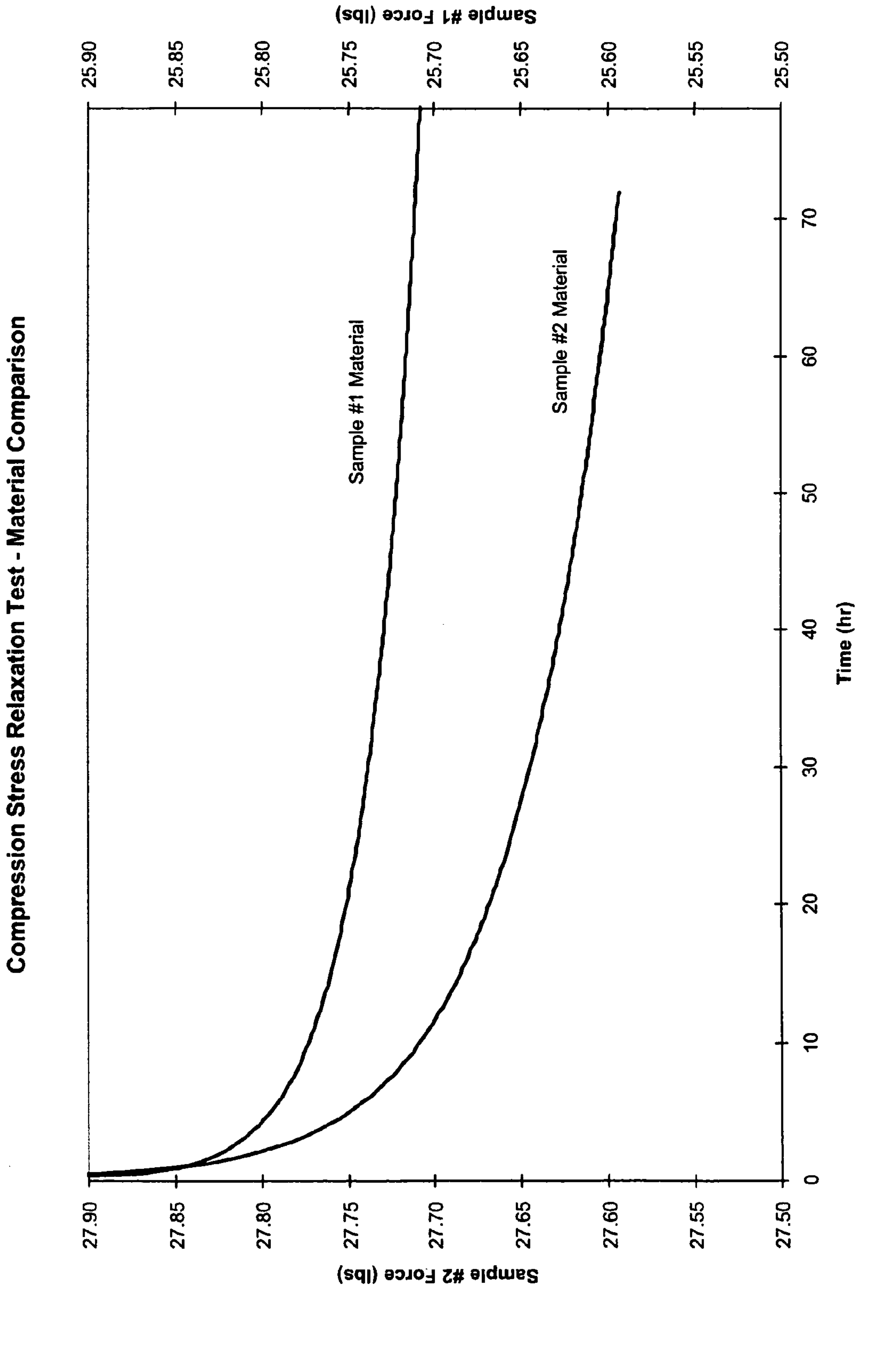
Fig. 1(a) Prior Art
FIG. 1(*a*) illustrates restorative force of two materials according to the prior art.
Figure 1B:
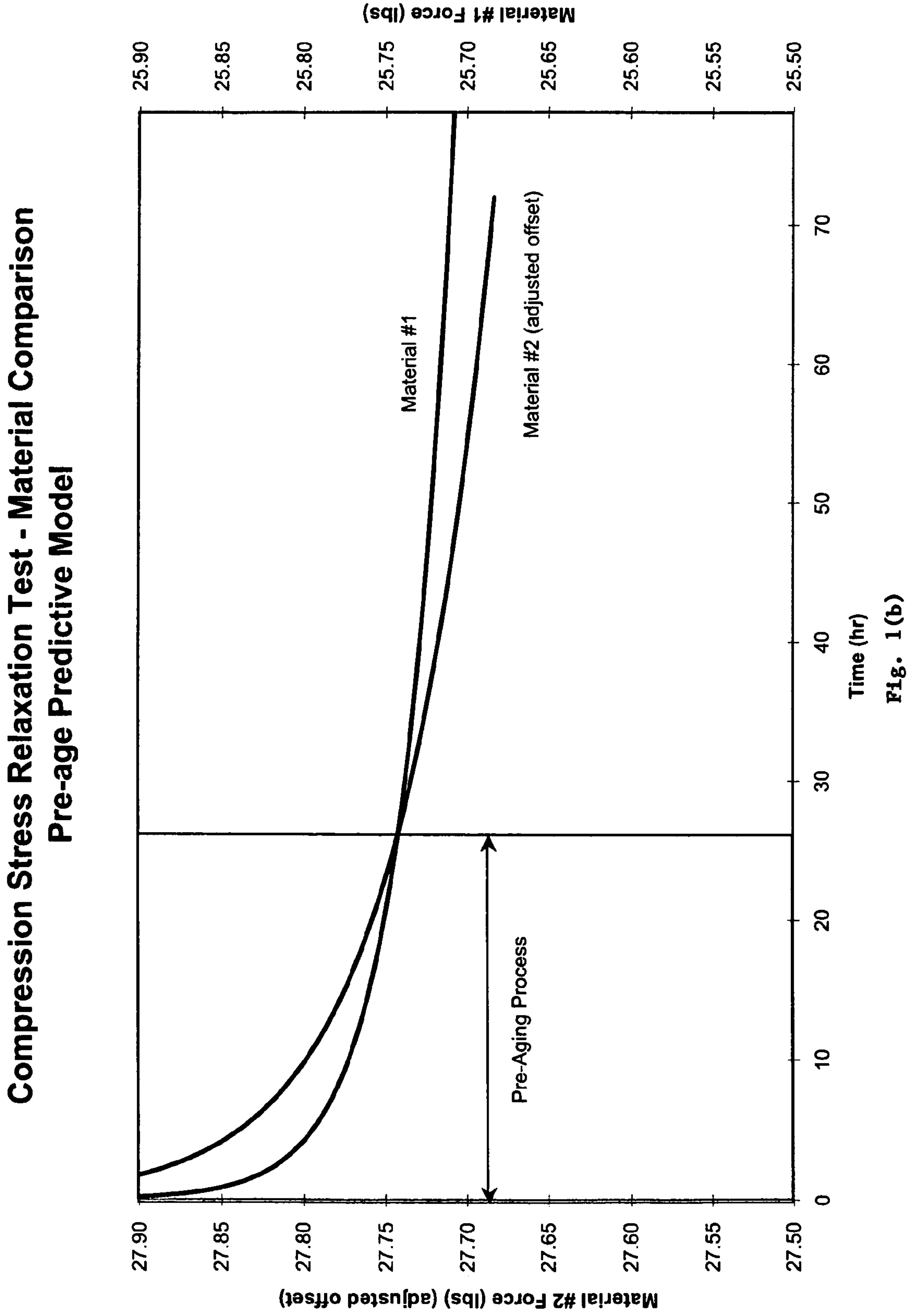

FIG. 1(*b*) is a graph illustrating a compression stress relaxation curve after pre-aging rollers according to an embodiment of the invention. Material 2 is a lower durometer material which is more desirable to be utilized in an imaging printing environment. As shown in FIG. 1(*b*), both material 1 and material 2 exhibit a logarithmic decay in restoration force. Most of the decay of restoration force occurs during an initialization or burn-in timeframe. This may be referred to as a pre-aging timeframe or pre-aging process. In the embodiment of the invention illustrated in FIG. 1(*b*), a pre-aging timeframe of 25 hours is utilized.

FIG. 1(*b*) illustrates the effect of the pre-aging technique or method on rollers made of material I and material 2. The pre-aging process is completed for a pre-aging timeframe or process. In comparing the restorative force for material 2 during the pre-aging process against the prior art (FIG. 1(*a*)), the decreasing slope-or decay in the restorative force is lessened due the application of the pre-aging process. For example, after 30 hours, the restorative force of material 2 is 27.65 pounds in the prior art, whereas during the application of the pre-aging process, the restorative force of material 2 is 27.25 pounds. After the pre-aging timeframe has been complete, the decay in the restoration force both of materials (i.e., materials 1 and 2) is better than if no pre-aging had occurred, especially for material 2. Specifically, the slope of the material 2 compression stress relaxation curve in FIG. 1(*b*) is lower than the slope of the second compression stress relaxation curve for material 2 in FIG. 1(*a*) (where no pre-aging occurred). This increase in restoration force for material 2 allows the utilization of material 2 in rollers in an imaging printer that prints two different media widths because the material 2 rollers subjected to the pre-aging process do not experience the reduction in the reaction force that prior art "relaxed" rollers previously experienced. A roller of material 1 could be utilized in an imaging printer, but because a defect in the roller may show up more frequently or prevalently in the roller of material one, material one may not be as useful in a roller environment.

Figure 2:
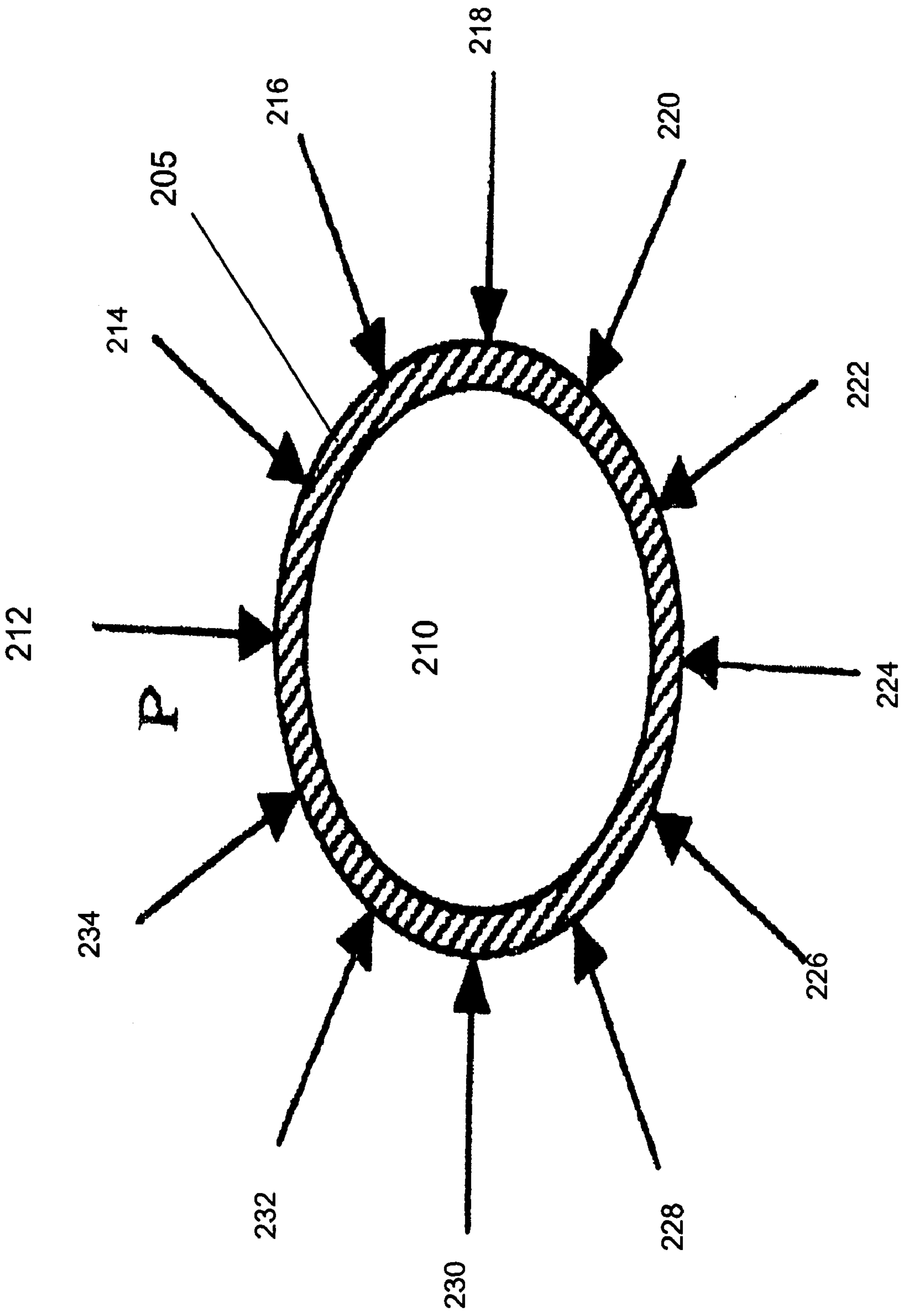
FIG. 2 illustrates a method for pre-aging rollers utilizing hydrostatic pressure according to an embodiment of the present invention.
Figure 2A:
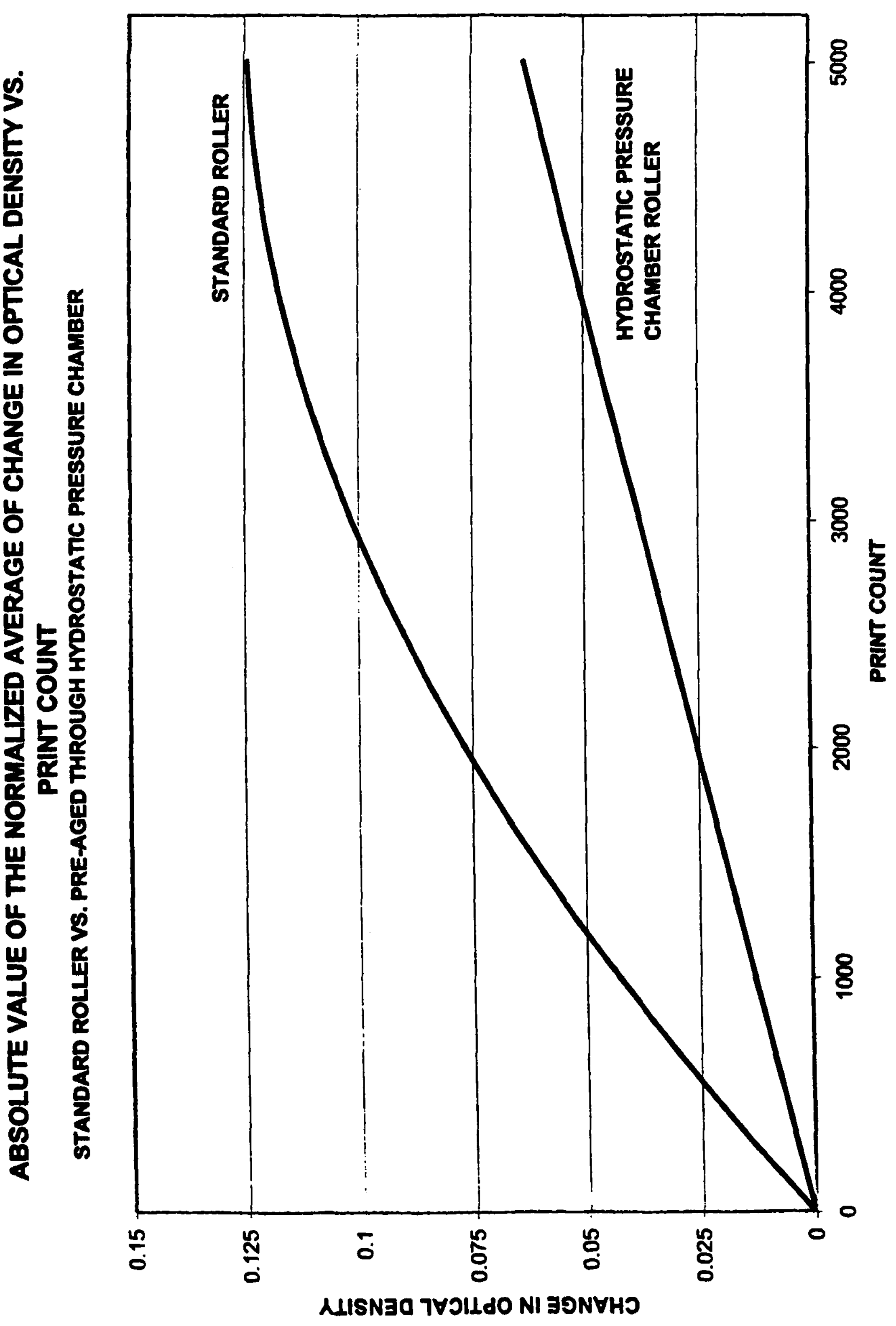
Figure 2B:
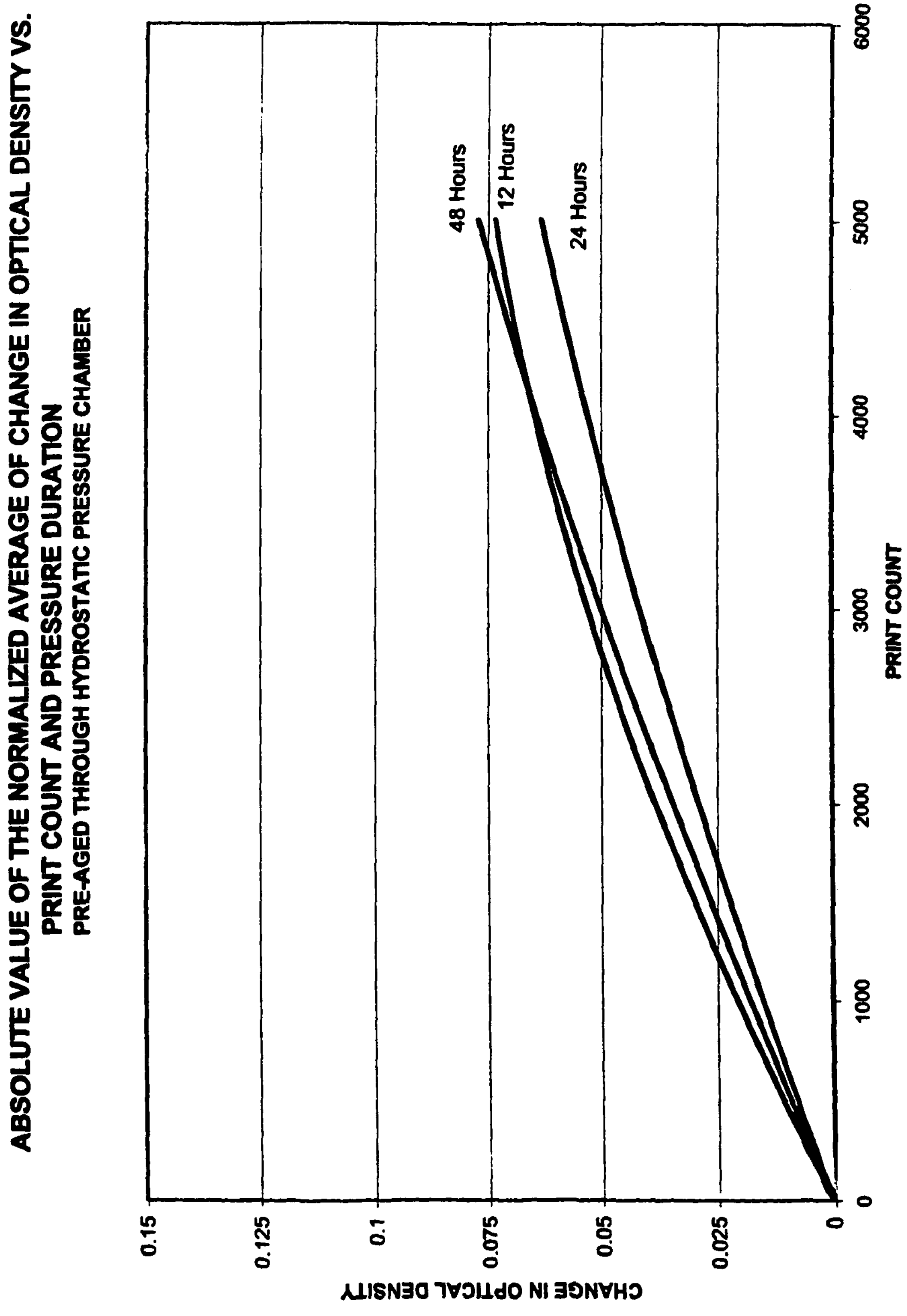
Figure 3A:
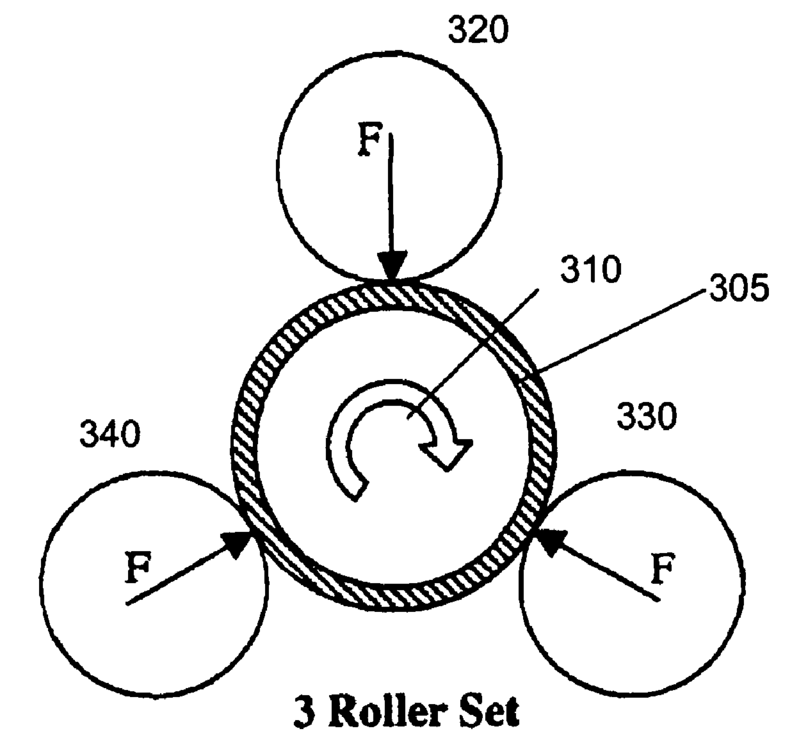
Figure 3B:
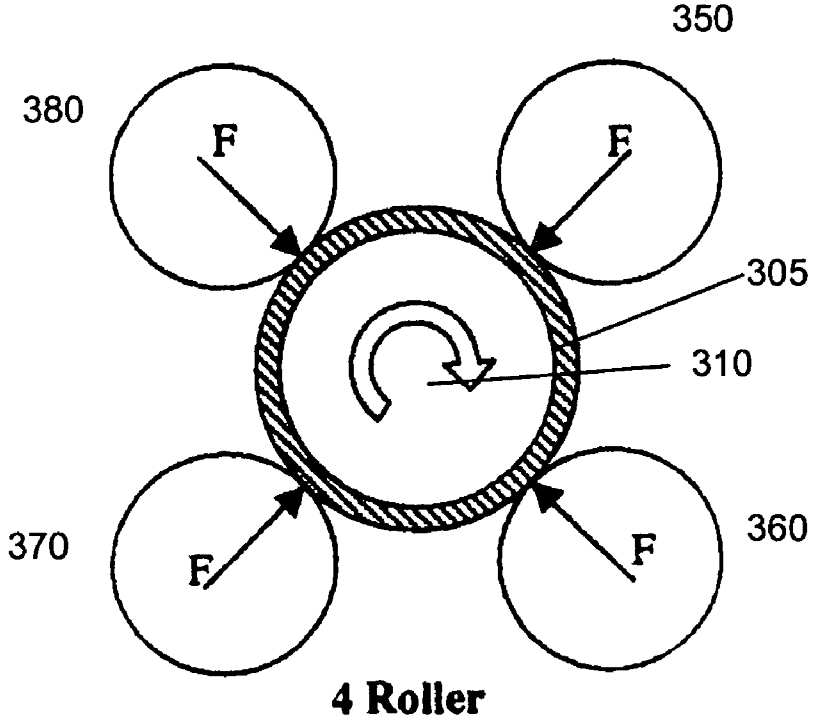
Figure 3C:
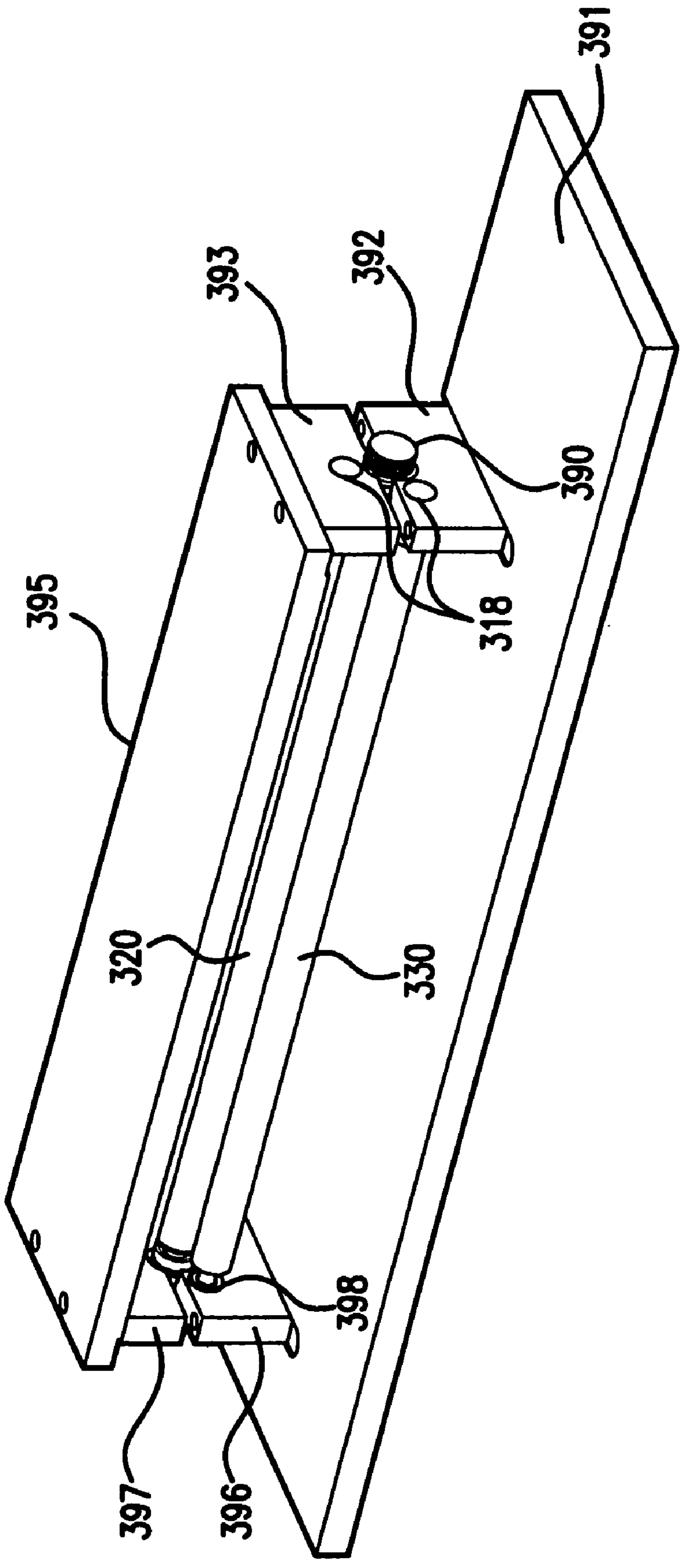
Figure 3D:
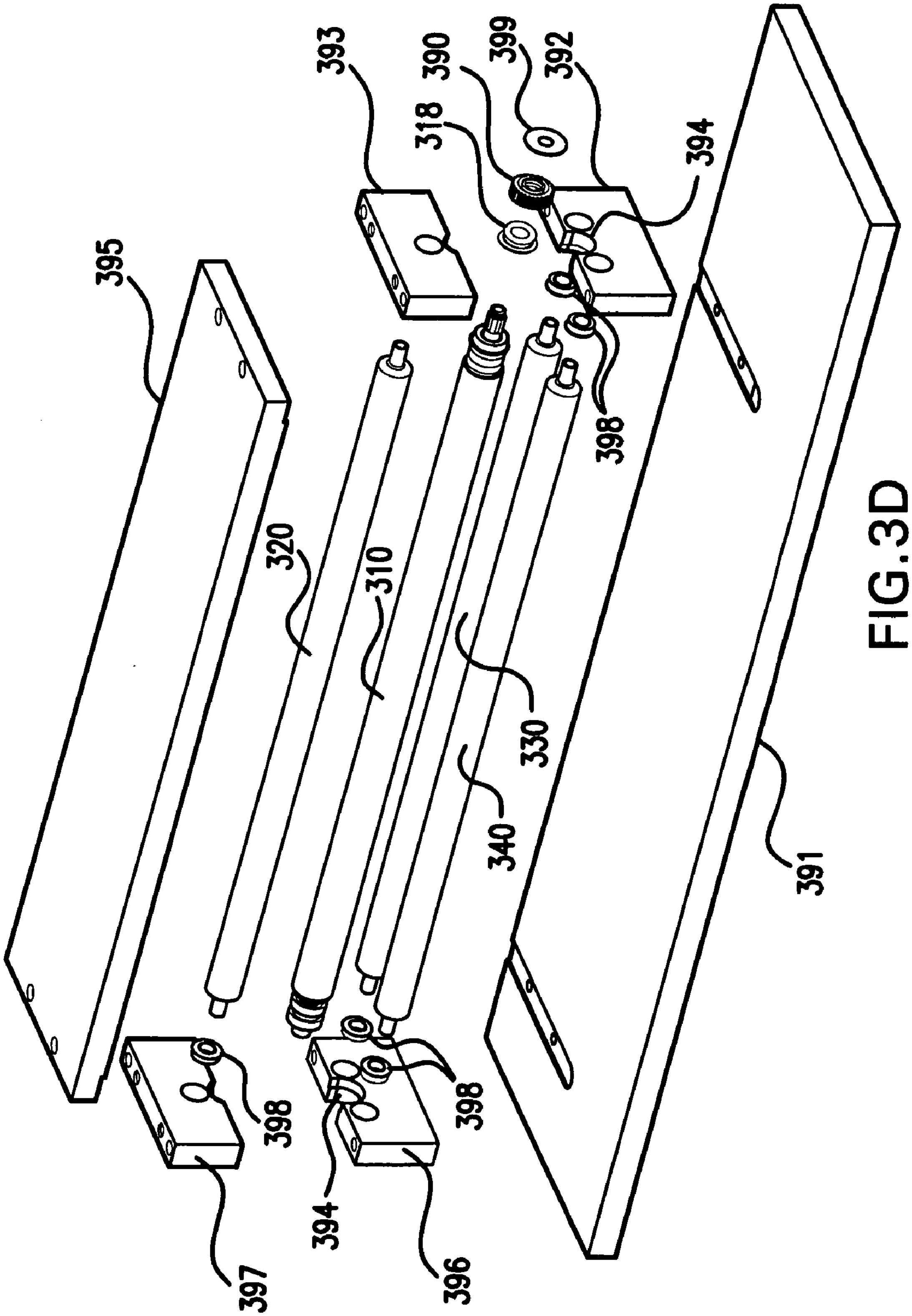
Figure 3E:
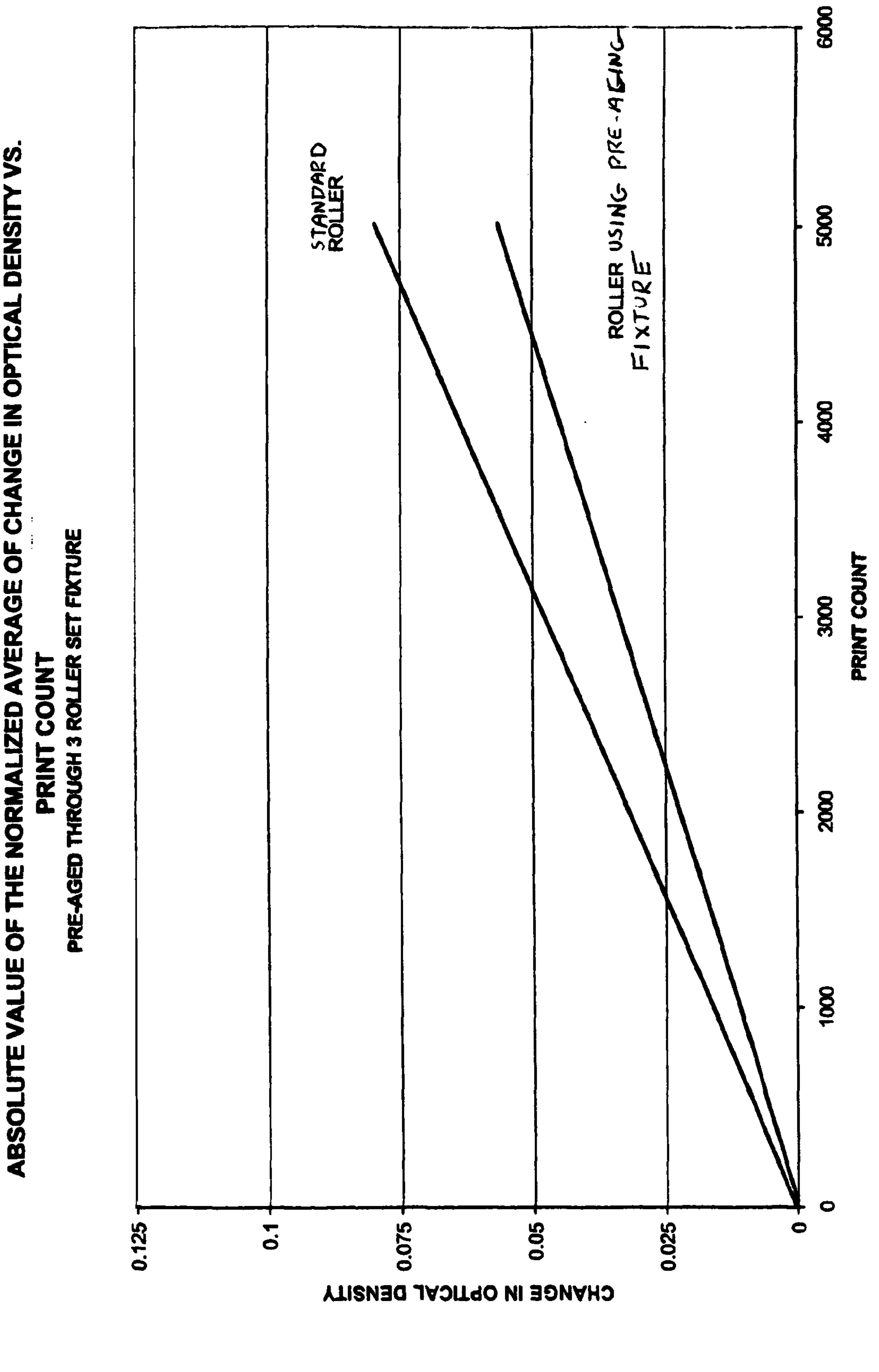

FIG. 2 illustrates a method for pre-aging rollers utilizing hydrostatic pressure according to an embodiment of the present invention. FIG. 2 includes a roller 210 and a plurality of forces 212, 214, 216, 218, 220, 222, 224, 226, 228, 230, 232, and 234 being applied against the roller 210. In an embodiment of the invention of the invention illustrated in FIG. 2, the method of pre-aging of the roller 210 may take place prior to installation of the roller in a machine. In an embodiment of the invention, the roller 210 may be utilized in is an imaging printer, for example, in a medical imaging environment. Illustratively, the roller 210 may be a platen roller in a multi-media imaging printer, such as a Codonics Horizon™ Multi-Media Printer.

In an embodiment of the invention, the plurality of forces 212, 214, 216, 218, 220, 222, 224, 226, 228, 230, 232, and 234 illustrated in FIG. 2 illustrate that forces are applied across the outer surface of the roller 210. The representative plurality of forces 212, 214, 216, 218, 220, 222, 224, 226, 228, 230, 232, and 234 may be generated through hydrostatic pressure. In other words, the plurality of forces 212, 214, 216, 218, 220, 222, 224, 226, 228, 230, 232, and 234 do not illustrate all of the forces generated by the hydrostatic pressure, but more represent that the hydrostatic pressure surrounds the roller 210 and applies forces to outer surfaces of the roller 210. In an embodiment of the invention, the hydrostatic pressure may pre-compress the roller 210 in order for the roller to advance to a time where the restoration force of the roller is more stable. For example, the application of hydrostatic pressure for a pre-aging timeframe allows the restoration force to stabilize (and have a smaller slope of decay) in the timeframe after the pre-aging timeframe (or in the timeframe immediately following the pre-aging timeframe).

In an embodiment of the invention, the hydrostatic pressure is applied by surrounding the roller with a pressurized gas in a pressurized chamber. In an embodiment of the invention, the hydrostatic pressure may be applied by a pressurized liquid in a pressurized chamber. The pressurized chamber may be any shape having a volume that allows for one or for a plurality of platen rollers to be placed in the pressurized chamber. The pressurized chamber may include a shelf or a ledge where the platen rollers, O-rings, or gaskets may be placed when undergoing the application of hydrostatic pressure. For example, the pressurized chamber may be a two foot by three foot rectangular chamber with an inlet or input port having a diameter of ¼". In an embodiment of the invention, the pressurized chamber may be a 2' by 3' cylindrical tank that receives a specified atmospheric pressure through a ¼" port.

In an embodiment of the invention, the pressurized gas may be compressed air. In an embodiment of the invention, the pressurized gas may be compressed nitrogen. In certain environments, compressed nitrogen may be easier to use on a production basis because compressed nitrogen is more inert than air. Additional illustrative gases, (this list is not meant to be limiting), may include noble gases which are very inert at room temperature. These gases include helium, neon, argon, krypton, and xenon. Certain gases may not be used if they cause a chemical reaction with the particular material being utilized for either the platen roller, O-ring, or gasket. For example, fluorine gas likely produces a reaction with the silicone rubber platen roller of a Codonics Horizon™ Multi-Media Imager and should not be utilized in a pressurized chamber where pre-aging of platen rollers is performed.

In an embodiment of the invention, the liquid may be water introduced into the chamber via the input port. In an embodiment of the invention, the liquid may be vegetable oils, glycerol, and/or isopropyl alcohol. These examples are merely illustrative and are not meant to be limiting. Liquids may be utilized in environments where pressure may need to be relieved safely because gases may "explode" if they for some reason rapidly expand, for example, if there is a processing equipment malfunction.

In an embodiment of the invention, the applied pressure within the compression chamber may be 90 pounds per square inch. In an embodiment of the invention, the applied pressure within the compression chamber may be 200 pounds per square inch. Almost any range of pressures 0-500 pounds per square inch (psi) may be utilized if platen rollers are placed in the compression chamber. As the applied pressure is lowered, the effect of the pressure may take longer. In other words, at a pressure of 20 psi, it may take three or four times the duration to introduce the same compression set or compression stress relaxation as compared to an applied pressure of 90 psi. The upper range limited only by where the deflection in the material cause by the hydrostatic loading exceeds the elongation limits of the material being utilized in the platen roller, O-ring, or gasket. If the deflection in the material exceeds the elongation limits of the material being utilized in the platen roller, O-ring, or gasket, damage would be visible on the surface of the platen roller, O-ring, or gasket. For example, in an embodiment of the invention utilizing gaskets or O-rings, up to 2000 psi may be utilized, if 2000 psi does not result in deflection in the material exceeding the elongation limits of the material.

FIG. 2(*a*) illustrates a change in optical density for a standard roller compared to a pre-aged roller (exposed to a hydrostatic chamber) according to an embodiment of the present invention. Larger changes in optical density are not desired in imaging printers because these larger changes result in artifacts within the medical images. FIG. 2(*a*) illustrates the improvement in the change of optical density for a hydrostatic chamber pre-aged roller. Illustratively, at the print count of 3000, the hydrostatic chamber pre-aged roller has only a change of 0.035 as compared to a change in optical density of 0.105 for a prior art platen roller.

In an embodiment of the invention, the duration that the pressure may be applied is 12 hours. In other embodiments of the invention, the pressure may be applied for 24, 36, or 48 hours. FIG. 2(*b*) illustrates application of a pressure over a duration of 12, 24, and 48 hours in a hydrostatic pressure chamber pressurized at 90 pounds per square inch. As illustrated by FIG. 2(*b*), 12 hours of 90 psi may produce results where the change or variation in optical density is reduced as compared to the prior art. 24 hours of 90 psi pressure results in a better reduction of the change in optical density. Further, 48 hours of 90 psi does not further reduce the reduction in the optical density variation and the results are very similar to the results after 12 hours of pressurization.

In an embodiment of the invention, the pressure may be applied at 90 psi for 12 hours, which results in a material of which the platen roller, O-ring, or gasket is constructed exhibiting the desired compression set and compression stress relaxation properties which do not change substantially over time. In an embodiment of the invention, the pressure may be applied at 200 psi for 5 hours which also results in a material exhibiting the desired stable compression set and compression stress relaxation properties. In an embodiment of the invention wherein a platen roller is exposed to 90 psi pressure for 12 hours and also longer durations, the compression set and compression stress relaxation within the first 12 hours does not change drastically if the pressure is applied for a longer period. In other words, the pre-aging may occur and most of the deflection or change of roller, gasket, and O-ring material may occur during this timeframe. After that, the curves tend to flatten out (as is illustrated in FIG. 1(*a*)). In an embodiment of the invention, a platen roller could be exposed to a hydrostatic pressure of 500 psi and be exposed to a pressure duration of two hours. A low limit of the time for the application of hydrostatic pressure is the time constant of the chemical reaction to break the chains and then reform the chains at the lower energy state.

In an embodiment of the invention, the hydrostatic pressure may be applied at a constant pressure which results in a static loading. In an embodiment of the invention, hydrostatic pressure may be applied at a variable pressure which may result in a dynamic loading. In an embodiment of the invention, the hydrostatic pressure may be applied for a first timeframe, no pressure (or a lessened pressure) may be applied for a second timeframe, and this may continue for a pre-established timeframe. This may be referred to as cycling of hydrostatic pressure. This cycling of high hydrostatic pressure and no or low hydrostatic pressure may be continued for the entire pre-aging timeframe. In an embodiment of the present invention, the cycling may occur with multiple pressure readings or pressurizations rather than a high pressure and no pressure.

The aspect ratio of the roller 210 may also have an impact on whether the pre-aging process is successful for platen rollers, O-rings, or gaskets. The aspect ratio may utilize the length, width, thickness, and height of a roller 210 and may impact on the efficiency of the roller 210. If the length, width, and height of the material which makes up the roller or the roller jacket 205 is not compressible, the material may not deflect. For example, if the roller jacket is a rubber sphere, which has an aspect ratio of 1 (i.e., the cross section is the same in all planes, then the sphere will not deflect because the rubber is incompressible. Accordingly, no pre-aging occurs with a rubber sphere roller jacket. A thin jacket roller 205 having a better ratio of diameter to the jacket thickness is deflectable, which allows for better radial compression while under hydrostatic pressure. Because the thin jacket roller 205 is deflectable, the pre-aging method utilizing hydrostatic pressure may improve the imaging characteristics of the roller 210. Accordingly, the larger the cross section of the jacket is relative to the circumferential area of the material being subjected to the pressure, the less effective the pre-aging process is. In an embodiment of the invention, the roller jacket thickness is 0.062" thick on a 0.75" diameter roller, where the roller is 14.5" in length. In this embodiment of the invention, the aspect ratio (i.e., the circumferential area divided by the cross sectional area) is 81 and pre-aging is effective.

FIGS. 3(*a*) and 3(*b*) illustrate an embodiment of the invention for dynamic loading of a platen roller according to embodiments of the present invention. In this embodiment of the invention, the platen roller is not stationary and mechanical forces press against the platen roller 310. The mechanical forces may be applied via multiple roller sets. Although FIGS. 3(*a*) and 3(*b*) illustrate a three roller set and four roller set, respectively, any number of pressuring rollers may be utilized to dynamically load the platen roller, for example, two, six, ten, or twenty pressuring rollers. The pressuring roller sets may dynamically load and unload a nip area (e.g., the jacket area) of the platen roller. This dynamic loading of the roller sets may introduce compression set and compression stress relaxation to the platen roller 310 during the time of the dynamical loading.

FIG. 3(*a*) illustrates a platen roller 310 and three pressuring rollers 320, 330 and 340. FIG. 3(*b*) illustrates a platen roller 310 and four pressuring rollers 350, 360, 370 and 380. In each embodiment (i.e., FIGS. 3(*a*) and 3(*b*), the platen roller 310 includes a roller jacket 305. In FIG. 3(*a*), the three pressuring rollers 320, 330 and 340 apply a pressure force, illustrated by the arrows designated F in FIG. 3(*a*), to the roller jacket 305 of the platen roller 310. The pressuring rollers 320, 330 and 340 apply the pressuring force to an outer surface of the roller jacket as portions of the outer surface pass by the pressuring rollers 320, 330 and 340. In the embodiment of the invention, the platen roller 310 is rotating and the pressuring rollers 320, 330' and 340 are not rotating. In an embodiment of the invention, the platen roller 310 may be rotating and the pressuring rollers may be rotating slightly in an opposite direction. In an embodiment of the invention, the platen roller 310 may not be rotating and the pressuring rollers 320 330 and 340 may be rotating. The platen roller 310, if rotating, may rotate in a clockwise direction, as illustrated in FIGS. 3(*a*) and (*b*) or may rotate in a counter-clockwise direction. The pressuring rollers 320 330 and 340 may also rotate in a clockwise direction. In the embodiments of the invention illustrated in FIGS. 3(*a*) and 3(*b*), the rotation of the platen roller 310 allows the pressuring rollers 320 330 and 340 to place a force against an outer surface of the roller jacket 305 in order to pre-age a material that makes up the outer surface of the roller jacket 305 and allow for no image artifacts on prints produced by the platen roller 310.

In an embodiment of the invention, illustrated in FIG. 3(*a*), the pressuring rollers 320, 330 and 340 may be placed an equal distant apart from each other around the platen roller 310. Illustratively, the pressuring rollers may be placed 120 degrees away from each other on the circumference of the platen roller 310. In alternative embodiments of the invention, the pressuring rollers 320 330 and 340 may be placed at different locations on the circumference of the platen roller 310.

In embodiments of the invention where the platen roller 310 is not rotating, one or more of the pressuring rollers may be rotating at a time. In other words, in these embodiments of the invention, one pressuring roller may be rotating for two seconds, a second pressuring roller may be rotating for a second set time, a third pressuring roller may be rotating for a third set time, and a fourth pressuring roller may be rotating for a fourth set time. Likewise, pairs of pressuring rollers or triples of pressuring rollers may be rotating at the same time while the other rollers of the roller set are not rotating.

In the embodiment of the invention illustrated in FIG. 3(*b*), the four pressuring rollers 350, 360, 370 and 380 apply the force to the roller jacket 305 of the platen roller. The four pressuring rollers operate in a similar fashion to the three pressuring rollers 320, 330 and 340 of FIG. 3(*a*). The four pressuring rollers 350, 360, 370 and 380 contact more of the outer surface of the roller jacket 305 than does the three pressuring roller set 320, 330 and 340. This may result in a quicker dynamic loading time for the roller jacket 305 of the platen roller if the four pressuring rollers 350, 360 370 and 380 are utilized rather than the three pressuring rollers 320, 330 and 340. This may result in a shorter time for the pre-aging process.

FIG. 3(*c*) illustrates a fixture for applying pressure according to an embodiment of the present invention. FIG. 3(*d*) illustrates an exploded view of the fixture for applying pressure according to an embodiment of the present invention. The fixture includes a bottom plate 391, a top plate 395, a bottom right vertical support plate 392, a top right vertical support plate 393, a bottom left vertical support plate 396, a top left vertical support plate 397, and a gear 390 that is driven by a motor (not shown). The fixture also operates on and includes the pressuring rollers 320 330 and 340 and the platen roller 310. The fixture may also include a plurality of bearings 398 and a washer 399.

In the embodiment of the invention, the bottom right vertical support plate 392 and the bottom left vertical support plate 396 are connected to the bottom plate 391. The top right vertical support plate 393 and the top left vertical support plate 397 are connected to the top plate 395. A pressuring roller 320 is connected, in one embodiment, via bearings 398 to the top right vertical support plate 393 and the top left vertical support plate 397. The pressuring rollers 340 and 330 are connected to the bottom right vertical support plate 392 and the bottom left vertical support plate 396 via bearings 398. The platen roller 310 fits into an opening 394 in the bottom right vertical support plate 392 and the bottom left vertical support plate 396. One end of the platen roller 310 includes a bearing 398, a gear 390, and a washer 399. The other end of the platen roller 310 includes a bearing 398, and a washer 399.

In the embodiment of the invention illustrated in FIGS. 3(*c*) and 3(*d*), the platen roller 310 is driven by the motor and may rotate in a clockwise or counterclockwise direction. The pressuring rollers 320 and 330, the bottom two pressuring rollers, passively rotate on their bearings 398. In this embodiment of the invention, the pressuring rollers 320 and 330 are not driven by a motor. In an embodiment of the invention, the pressuring roller 340, the top pressuring roller, also passively rotates on its bearing 398. Alternatively, the top pressuring roller 340, which is mounted the top plate, is effectively free to slide on the guide pins and holes found in the vertical support plates. In other words, the top pressuring roller is not rotationally constrained by the bearing 398 but it is constrained in a horizontal plane by the vertical support plates 397 and 393 because the guide pins and holes allow the top right and left vertical support plates to move up and down in response to any contact from the platen roller 310.

In the embodiment of the invention illustrated in FIGS. 3(*c*) and 3(*d*), a deadweight load is applied to the top plate 395 in order to exert a pressure on the platen roller 310. The application of the deadweight load presses the top pressuring roller 340 against the platen roller 310 and also brings the platen roller into stronger contact with the two bottom pressuring rollers 320 and 330.

In an embodiment of the invention, the deadweight load may be 10, 15, 25, 30, or 40pounds. The mass of the deadweight load is determined by knowing the pressure to be applied to the roller in order to initiate the pre-aging process and start the compression set/compression stress relaxation process. For example, the application of 25 pounds on a platen roller equates to 3.1 pounds per linear inch of the platen roller length. In an embodiment of the invention, the deadweight load may be applied for one day, one week, two weeks, eighteen days, or one month. The duration of the application of the deadweight load is determined based on the characteristics of the material of the platen roller 310 and how much weight is applied (i.e., the deadweight load).

FIG. 3(*e*) illustrates a change in optical density in a roller that is placed in the pre-aging process fixture according to an embodiment of the invention. The higher line represents the change in optical density for a platen roller of the prior art. The lower line represents the change in optical density after a set number of prints for a platen roller exposed to the pre-aging process in the three-roller set utilizing a fixture. As is illustrated in FIG. 3(*e*), the change in optical density is lessened (i.e., improved) with the roller subjected to the pre-aging process in the fixture. Illustratively, at 3000 prints, the pre-aged roller has a change in optical density of 0.035 while the prior art roller has a change in optical density of 0.045. At 4,500 prints, the pre-aged roller has a change in optical density of 0.05 while the prior art roller has a change in optical density of 0.07.

FIGS. 4(*a*) and 4(*b*) illustrate a pre-aging technique for flat or a complex-shaped structure or geometry according to an embodiment of the invention. In embodiments of the invention, the flat or complex-shaped structure or geometry may be an O-ring or a gasket. The O-ring or gasket may be formed of a low durometer material. The low durometer material may be, for example, Neoprene, Silicone, Urethane, EPDM, or Buna-N. FIG. 4(*a*) illustrates a structure 405, a first pressure apparatus 410, and a second pressure apparatus 415 according to an embodiment of the present invention. FIG. 4(*b*) includes a complex geometry structure 420, a first pressure apparatus 425, and a second pressure apparatus 430 according to an embodiment of the present invention. The structure 405 or 420 may be referred to as a O-ring or gasket, but the invention is equally applicable to other structures made of low durometer materials. The pre-aging method of the invention can also improve higher durometer materials as well. The need for pre-aging is less for higher durometer elastomers or materials in general, however improvement may sometimes be obtained. For example, SBR rubber has poor compression set properties at higher durometers and better at lower durometers. Potentially, the pre-aging technique can be applied to SBR and improve its performance at high durometers as well.

In the embodiment of the invention illustrated in FIG. 4(*a*), the pre-aging technique utilizes a first pressure apparatus 410 to press against a top surface of a O-ring or gasket 405. Alternatively, or in addition to, the pre-aging technique utilizes a second pressure apparatus 415 to press against a bottom side of the O-ring or gasket 405. In the embodiment of the invention, the first pressure apparatus 410 and the second pressure apparatus 415 may press against the O-ring or gasket 405 simultaneously. In another embodiment of the invention, the first pressure apparatus 410 may press against the O-ring or gasket 405 first and the second pressure apparatus 415 may press against the O-ring or gasket 405 immediately after or at a predetermined time after the first pressure apparatus 415. In other words, the first pressure apparatus 410 and the second pressure apparatus 415 may operate sequentially. In an embodiment of the invention, another pressure apparatus may press against a side surface 408 or 409 of the O-ring or gasket 405 at a different time than the first pressure apparatus 410 and the second pressure apparatus 415 press against the O-ring or gasket 405. The pressure applied by the first pressure apparatus 410 and the second pressure apparatus 415 is illustrated by the arrows and the symbol F in both FIG. 4(*a*) and FIG. 4(*b*). The pre-aging technique illustrated in FIGS. 4(*a*) and 4(*b*) causes compression set and compression stress relaxation and accelerates the movement of the O-ring or gasket to a more stable area of the compression stress relaxation curve. In other words, the material, in the case of O-rings and gaskets, is moved on an accelerated pace to where the material is in a stable state where minimal or no material relaxation occurs, i.e., the reactive force is predictable (either flat or at a linear slope).

In the embodiment of the invention illustrated in FIG. 4(*b*), because the O-ring or gasket geometry 420 is complex, i.e., it is not flat and may have different heights for different surfaces, the first pressure apparatus 425 may be a die that is formed to conform with the surfaces of the O-ring or gasket. As illustrated in FIG. 4(*b*), the first pressure apparatus 425 may include a cutout 450 that accommodates the raised surface 435 or the O-ring or gasket 420. This allows the first pressure apparatus 425 to press in a top surface of the complex geometry O-ring or gasket 420 in a uniform fashion. Alternatively, or in addition to, the second pressure apparatus 430 may also press against the complex geometry O-ring or gasket 420. As illustrated in FIG. 4(*b*), the complex geometry O-ring or gasket 420 may include a raised portion 440 on its bottom surface, and the second pressure apparatus 430 may include a cutout 455 to allow for the second pressure apparatus 430 to press in a uniform fashion against most of the bottom surface of the complex geometry O-ring or gasket 420.

FIG. 4(*c*) illustrates a plurality of pressure apparatus and a complex geometry O-ring or gasket according to an embodiment of the present invention. FIG. 4(*c*) includes a pre-aging system including a first pressure mechanism 470, a second pressure mechanism 472, a third pressure mechanism 474, a fourth pressure mechanism 476, a fifth pressure mechanism 478, a sixth pressure mechanism 480, and an O-ring or gasket-485. In this embodiment of the invention, a plurality of pressure apparatus apply a force against a surface of the O-ring or gasket. As compared to FIG. 4(*b*), it is different because each pressure apparatus is pressing against a flat surface of the O-ring or gasket. In addition, the first pressure mechanism 470, second pressure mechanism 472, and third pressure mechanism 474 may press against the O-ring or gasket 485 at different times. In an embodiment of the invention, the first pressure mechanism 470, the second pressure mechanism 472, and the third pressure mechanism 474 may press against the O-ring or gasket at the same time but at a different time than the fourth pressure mechanism 476, the fifth pressure mechanism 478, and the sixth pressure mechanism 480. In an alternative embodiment of the invention, all six of the pressure mechanisms (470, 472, 474, 476, 478, and 480) apply force against the O-ring or gasket at the same time.

FIG. 5 illustrates a flowchart of a method of extending platen roller life and increasing performance according to an embodiment of the invention. A number of sheets of small format media are loaded and a number of sheets of large format media are loaded 510 into an imaging printer. In an embodiment of the invention, like the embodiment illustrated in FIG. 4, a roller pre-aging software program is executed 520. In other embodiments of the invention, no roller pre-aging software program may be executed and the following steps may be performed manually. The roller pre-aging software program automatically prints 530 out a number of small format media sheets. The roller pre-aging software program may then print 540 a number of large format media sheets. The roller pre-aging software program may determine if a pre-determined time 550 has elapsed. Alternatively, or in addition to, the roller pre-aging software program may determine if a threshold number of prints have been printed 555. If the pre-determined time 550 has elapsed or the threshold number of prints have been printed, the roller pre-aging software program may stop or may stop executing 560. If the pre-determined time has not elapsed, the roller pre-aging software program returns to step 530 and prints out a number of small format sheets. If the pre-determined number of prints has not elapsed, the roller pre-aging software program returns to step 530 and prints out a number of small format media sheets. The roller pre-aging software program keeps operating until the pre-determined time has elapsed or alternatively, the pre-determined number of prints has been reached.

In an embodiment of the invention, for each iteration of the pre-aging cycle, i.e., steps 530 and 540—printing of small format media sheets and large format media sheets, a different number of media sheets may be printed out. Illustratively, under certain operating conditions, during the first iteration, ten small format media sheets may be printed and 30 large format media sheets may be printed while in the second iteration, twenty small format media sheets may be printed and 40 large format media sheets may be printed. In an embodiment of the invention, during each iteration of the pre-aging method, the same number of small format media sheets and a different number of large format media sheets may be printed (with the different number of large format media-sheets being the same for each iteration). For example, for each iteration of the pre-aging method, 2 small format media sheets may be printed and 10 large format media sheets may be printed.

In an embodiment of the invention, the roller pre-aging software program may keep the ratio of small format media sheets to large format media sheets the same during each iteration so the roller pre-aging software program may print out a corresponding (in terms of ratio) small format media sheets to large format media sheets. For example, in iteration one of the roller pre-aging software program, two small format media sheets may be printed and six large format media sheets may be printed. In the second iteration of the roller pre-aging software program five small format media sheets may be printed and fifteen large format media sheets may then be printed. In this example, the ratio remains three large format media sheets to one small format media sheet.

In an embodiment of the invention, the media may be film for printing images. Alternatively, the media may be small format and large format bond paper. The ratio of small format to large format is established to minimize the negative effects of the compression set and compression stress relaxation of the roller. The result of the this pre-aging software program is that there is a minimal differential in material relaxation and set between the portions of the roller that are compressed with just the large format media (edges of roller) and the portions of the roller that are compressed by both the large and small format media (center of the roller).

Illustratively, the roller pre-aging software program may print an image on one small format media sheet followed by 2 large format media sheets, followed by two small format media sheet followed by four large format media sheets. The software program continues this printing until either a time threshold is reached, e.g., 8 hours or 16 hours, or a print threshold is reached, e.g., 5,000, 10,000, or 20,000 prints). After either the time threshold or print threshold is reached the relaxation and the compression set of the media is relatively stable and minimal changes may occur.

The invention claimed is:

1. A method of stabilizing an elastomeric property of an elastomeric material, comprising:

placing the elastomeric material in a pressurizing chamber;

applying a hydrostatic pressure to the elastomeric material within the pressurizing chamber to at least partially compress the elastomeric material, wherein the hydrostatic pressure applied to the elastomeric material within the pressurizing chamber is less than a pressure required to deflect the elastomeric material beyond an elongation limit of the elastomeric material; and maintaining application of the hydrostatic pressure for a period of time to at least partially stabilize a restorative force exhibited by the elastomeric material in response to subsequent exposures of the elastomeric material to a compressive force, wherein the hydrostatic pressure pre-compresses the elastomeric material to advance the elastomeric material to a condition where the restorative force of the elastomeric material is more stable.

2. The method of claim 1, wherein a gas is utilized to apply the hydrostatic pressure to the elastomeric material.

3. The method of claim 2, wherein the gas is compressed air.

4. The method of claim 2, wherein the gas is compressed nitrogen.

5. The method of claim 2, wherein the gas is applied at 90 pounds per square inch.

6. The method of claim 5, wherein the gas is applied for 12 hours.

7. The method of claim 2, wherein the gas is applied at 200 pounds per square inch for 5 hours.

8. The method of claim 1, wherein a liquid is utilized in the pressurizing chamber to apply the hydrostatic pressure to the elastomeric material.

9. The method of claim 8, wherein the liquid is one of a group of liquids, the group of liquids consisting of a vegetable oil, a glycerol, and an isopropyl alcohol.

10. The method of claim 8, wherein the liquid is water.

11. The method of claim 1, wherein the elastomeric property comprises a compression set value of the elastomeric material, and the compression set value is at least partially stabilized when a rate of degradation of the compression set value slows relative to an initial rate of degradation.

12. The method of claim 1, wherein the elastomeric material is in a generally-cylindrical shape when the hydrostatic pressure is applied to the elastomeric material.

13. The method of claim 12, wherein the elastomeric material in the generally cylindrical shape is to be used as a roller in a computer output device after the elastomeric property is at least partially stabilized.

14. A method of stabilizing an elastomeric property of an elastomeric material, comprising:

placing the elastomeric material in a pressurizing chamber; and applying hydrostatic pressure to the elastomeric material within the pressurizing chamber for a period of time to at least partially stabilize the elastomeric property of the elastomeric material, wherein the hydrostatic pressure applied to the elastomeric material within the pressurizing chamber is less than a pressure required to deflect the elastomeric material beyond an elongation limit of the elastomeric material, and the elastomeric property comprises a compression-set-relaxation value of the elastomeric material, and the compression-set-relaxation value is at least partially stabilized when a rate of degradation of the compression-set-relaxation value slows relative to an initial rate of degradation, wherein the hydrostatic pressure pre-compresses the elastomeric material to a condition where the compression-set-relaxation value of the elastomeric material is more stable.

* * * * *